United States Patent
Isert et al.

(10) Patent No.: US 9,784,841 B2
(45) Date of Patent: Oct. 10, 2017

(54) METHOD OF DETERMINING THE OWN-VEHICLE POSITION OF A MOTOR VEHICLE

(75) Inventors: Carsten Isert, Munich (DE); Daniel Niehues, Munich (DE); Bernd Biechele, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1125 days.

(21) Appl. No.: 13/149,510

(22) Filed: May 31, 2011

(65) Prior Publication Data

US 2011/0295503 A1    Dec. 1, 2011

(30) Foreign Application Priority Data

Jun. 1, 2010  (DE) .......................... 10 2010 029 589

(51) Int. Cl.
| | |
|---|---|
| *G01C 21/00* | (2006.01) |
| *G01S 19/12* | (2010.01) |
| *G01C 21/26* | (2006.01) |
| *G01S 5/14* | (2006.01) |
| *G01S 19/48* | (2010.01) |

(52) U.S. Cl.
CPC ............. *G01S 19/12* (2013.01); *G01C 21/26* (2013.01); *G01S 5/14* (2013.01); *G01S 19/48* (2013.01)

(58) Field of Classification Search
USPC ........................................................ 455/420
See application file for complete search history.

(56) References Cited

U.S. PATENT DOCUMENTS

| | | | |
|---|---|---|---|
| 6,229,479 B1* | 5/2001 | Kozlov | G01S 19/425 342/357.34 |
| 7,042,391 B2 | 5/2006 | Meunier et al. | |
| 7,812,762 B2* | 10/2010 | Shamoto | G01S 19/43 342/357.26 |
| 8,078,192 B2* | 12/2011 | Wirola | G01S 19/04 455/456.1 |
| 8,686,901 B2* | 4/2014 | Wirola | G01S 19/04 342/357.27 |

(Continued)

FOREIGN PATENT DOCUMENTS

| | | |
|---|---|---|
| DE | 101 00 407 A1 | 7/2002 |
| DE | 60 2004 006 703 T2 | 1/2008 |

(Continued)

OTHER PUBLICATIONS

Machine translation of JP Patent No. 2007-033220,A from http://www4.ipdl.inpit.go.jp/Tokujitu/tjsogodbenk.ipdl (May 7, 2014).*

*Primary Examiner* — Jean-Paul Cass
(74) *Attorney, Agent, or Firm* — Crowell and Moring LLP

(57) ABSTRACT

A method of determining the own-vehicle position of a motor vehicle having a navigation system fixedly installed in the motor vehicle includes the steps of: providing a mobile terminal having the suitability for self-localization; providing an interface for the communication-related link-up of the mobile terminal to the motor vehicle; determining the own-terminal position of the mobile terminal by self-localization; transmitting the own-terminal position by way of the interface to the motor vehicle; and taking into account the transmitted own-terminal position when determining the own-vehicle position.

11 Claims, 1 Drawing Sheet

(56) References Cited

U.S. PATENT DOCUMENTS

| | | | |
|---|---|---|---|
| 2005/0285723 A1* | 12/2005 | Chen | B60R 25/102 340/426.15 |
| 2006/0023655 A1* | 2/2006 | Engel | G01S 19/21 370/328 |
| 2007/0037607 A1* | 2/2007 | Matsuda | H04M 1/6091 455/569.2 |
| 2007/0287439 A1 | 12/2007 | Weyl et al. | |
| 2007/0291664 A1 | 12/2007 | Weyl et al. | |
| 2008/0007120 A1 | 1/2008 | Weyl et al. | |
| 2008/0150751 A1* | 6/2008 | Sala | G01D 4/00 340/870.02 |
| 2008/0248815 A1* | 10/2008 | Busch | H04W 4/02 455/456.5 |
| 2008/0309550 A1* | 12/2008 | Sairo | G01S 5/0027 342/357.27 |
| 2009/0077229 A1* | 3/2009 | Ebbs | G08G 1/207 709/224 |
| 2009/0179746 A1* | 7/2009 | Hsiang | B60R 25/1004 340/426.1 |
| 2009/0225959 A1* | 9/2009 | Sierra | H04M 3/42229 379/88.01 |
| 2009/0240427 A1* | 9/2009 | Siereveld | G01C 21/3469 701/533 |
| 2009/0318185 A1* | 12/2009 | Lee | H04M 1/72527 455/550.1 |
| 2010/0278079 A1 | 11/2010 | Meyer et al. | |
| 2011/0074625 A1* | 3/2011 | Wirola | G01S 19/55 342/357.25 |
| 2013/0099965 A1* | 4/2013 | Sairo | G01S 5/0027 342/357.42 |

FOREIGN PATENT DOCUMENTS

| | | |
|---|---|---|
| DE | 10 2008 036 681 A1 | 7/2009 |
| DE | 10 2008 053 176 A1 | 4/2010 |
| EP | 1 333 248 A1 | 8/2003 |
| JP | 200703320 A * | 8/2007 |
| WO | WO 02/37446 A1 | 5/2002 |
| WO | WO 2006/063601 A1 | 6/2006 |
| WO | WO 2006/063602 A1 | 6/2006 |
| WO | WO 2006/063603 A1 | 6/2006 |

* cited by examiner

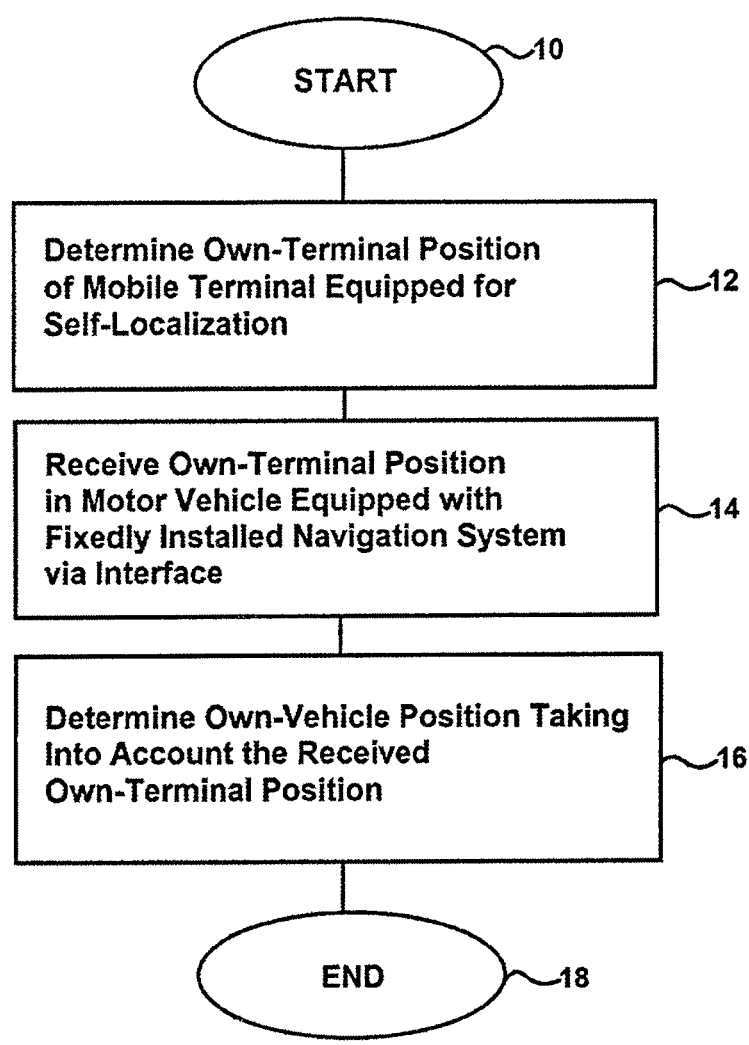

METHOD OF DETERMINING THE OWN-VEHICLE POSITION OF A MOTOR VEHICLE

CROSS-REFERENCE TO RELATED APPLICATION

This application claims priority under 35 U.S.C. §119 from German Patent Application No. DE 10 2010 029 589.2, filed Jun. 1, 2011, the entire disclosure of which is herein expressly incorporated by reference.

BACKGROUND AND SUMMARY OF THE INVENTION

The invention relates to a method of determining the own-vehicle position of a motor vehicle having a navigation system fixedly installed in the motor vehicle.

Modern motor vehicles are increasingly equipped with navigation systems, frequently even in series. Navigation systems fixedly installed in motor vehicles determine the position of the motor vehicle in which it is installed (in the following, also called "own-vehicle position") within the global area imaged on a road map, usually on the basis of GPS or GNSS. Particularly in city center areas with blocks of high buildings, in tunnels or parking garages, the problem may arise that self-localization by GPS/GNSS is not easily possible, for example, because of shadowing and multi-path effects. The same may apply, or may especially apply, when the driver is driving into or out of a parking garage in the center of town.

These types of problems can partly be solved in that additional vehicle sensors (odometry sensors: steering angle, yaw rate, velocity, wheel speeds, etc.) of the respective motor vehicle are used in order to permit an updating of the own-vehicle position by means of a so-called dead reckoning. This occurs also if the GPS/GNSS should fail. However, in this manner, the accuracy of the self-localization can only be improved. Lasting maximum accuracy of the self-localization cannot be guaranteed in this manner—this is particularly true if the GPS/GNSS failures last for a very long time, or if there are several street levels or parallel streets situated side-by-side.

It is an object of the invention to provide a simple improved method for determining the own-vehicle position of a motor vehicle.

This and other objects are achieved by a method of determining the own-vehicle position of a motor vehicle having a navigation system fixedly installed in the motor vehicle, the method includes the steps of: providing a mobile terminal having suitable self-localization; providing an interface for communication-related link-up of the mobile terminal to the motor vehicle; determining the own-terminal position of the mobile terminal by self-localization; transmitting the own-terminal position by way of the interface to the motor vehicle; and taking into account the transmitted own-terminal position when determining the own-vehicle position.

According to the invention, the capability of the mobile terminal for self-localization—which is independent, for example, of shadowing and/or failures of a satellite signal (GPS/GNSS)—is utilized in order to support the self-localization of the navigation system installed in the motor vehicle.

From DE 10 2008 036 681 A1, as an example, a method is known for self-localization based on wireless radio networks, particularly the WLAN, especially for a mobile terminal. As a result of the increasing spread of wireless networks based, for example, on the WLAN standard, these wireless networks present themselves as a basis for new localization methods. In addition to WLAN networks, mobile radio networks (with known locations of the mobile radio masts) also present themselves as wireless radio networks for self-localization. For mobile terminals, it is also known to use a self-localization by way of GPS/GNSS combined with a self-localization by way of wireless radio networks. Since sometimes acceleration sensors and/or compasses are also installed in mobile terminals, even—comparable with the odometry in the case of motor vehicles—motion data of the mobile terminal can be used for the updating of the own-terminal position. The potential of the equipment and processes known from prior art for the self-localization of mobile terminals has, however, so far not been utilized satisfactorily for vehicle navigation.

It is true that complete navigation solutions for motor vehicles are already available on the market, in the case of which a mobile terminal, such as a Smartphone, is used in a vehicle adaptor in the driver's field of vision in order to serve there as a navigation device. However, these solutions are almost exclusively based on the capabilities of the mobile terminal—specifically essentially on its capability to determine the own-terminal position (by means of locating devices arranged in the mobile terminal) and on its capability to graphically display maps and/or navigation instructions (by means of a display of the mobile terminal). This replaces a navigation system fixedly installed in a motor vehicle. In contrast, in the case of the invention, the navigation system fixedly installed in the motor vehicle will not be replaced but be fully utilized and expanded in its capabilities. Capabilities which do not exist according to the state of the art in the case of a navigation system fixedly installed in a motor vehicle will be supplemented by capabilities of the mobile terminal.

Operating input (such as the destination input and/or the selection of the map alignment and/or the selection of the scale) within the scope of a vehicle navigation, which is based on a self-localization taking place according to the invention, preferably takes place exclusively by way of operating devices of the motor vehicle. Graphic and/or acoustic output to the operator within the scope of a vehicle navigation, which is based on a self-localization occurring according to the invention, preferably takes place exclusively by way of output devices (such as the display and/or the loudspeaker) of the motor vehicle.

To this extent, the invention also relates to an overall system suitable for implementing the method according to the invention, composed of a navigation system fixedly installed in the vehicle and a mobile terminal, in the case of which overall system, the own-vehicle position determined while taking into account the transmitted own terminal position, within the scope of a vehicle navigation, is used by the navigation system fixedly installed in the vehicle. In such a case, operating input within the scope of the vehicle navigation can take place exclusively by way of operating devices of the motor vehicle—not by way of the mobile terminal or its operating devices.

In addition, to this extent, the invention also relates to an overall system suitable for implementing the method according to the invention, composed of a navigation system fixedly installed in the vehicle and a mobile terminal, in the case of which overall system, the own-vehicle position determined while taking into account the transmitted own terminal position, within the scope of a vehicle navigation, is used by the navigation system fixedly installed in the vehicle. In such a case, graphic and/or acoustic output to the operator within the scope of the vehicle navigation exclusively takes place by way of output devices of the motor vehicle—not by way of the mobile terminal or its output devices.

In the case of the motor vehicle, a preferably dedicated interface is provided according to the invention for integrating the mobile terminal. By way of this interface, preferably particularly the own-position data of the mobile terminal determined by radio-network-based self-localization can be transmitted to the motor vehicle, particularly to the navigation system fixedly installed in the motor vehicle. From BMW's International Patent Publications WO 2006/063601 A1, WO 2006/063602 A1 and WO 2006/063603 A1, systems and methods are known for integrating a mobile terminal in a motor vehicle. The interface may be wireless or wire-based.

Furthermore, by way of the above-mentioned interface, a request of the motor vehicle or of the navigation system fixedly installed in the motor vehicle can be transmitted to the mobile terminal, by which request the mobile terminal is prompted to send own-terminal position data to the motor vehicle or to the navigation system fixedly installed in the motor vehicle. The motor vehicle can thereby request own-terminal position data particularly (or exclusively) if there is a corresponding demand. In this manner, the data volume transmitted by way of the interface can be reduced. Likewise, in this manner, an improved on-time providing of the required own-terminal position data by the mobile terminal to the motor vehicle can be achieved.

According to a preferred embodiment of the invention, by way of the interface, a request of the motor vehicle is sent to the mobile terminal by which the mobile terminal is prompted to transmit own-terminal position data by way of the interface.

For determining the demand for own-terminal position data, a demand detection unit may be provided in the case of the motor vehicle. This demand detection unit can especially be constructed as a software module of the navigation software of the navigation system fixedly installed in the motor vehicle. The demand can be determined according to the situation. For the determination, different quantities can be analyzed, which can be detected by measuring or exist in the case of the motor vehicle anyhow. Demand can, for example, be recognized when the navigation system fixedly installed in the motor vehicle does not succeed in achieving a self-localization. However, demand can, in principle, also be assumed when a mobile terminal is connected to the interface and/or when the motor vehicle is situated in a populated area (especially in the center of a city). Various indicators of such a demand can contribute to a common measurement for the demand.

Thus, according to a further preferred embodiment of the invention, a demand or a measurement of the demand for receiving own-terminal position data is determined in the case of the motor vehicle, and a request of the motor vehicle is sent to the mobile terminal if the demand exists or if the measurement of the demand exceeds a predefined demand threshold.

The accuracy—to be determined beforehand—of a position signal based on satellite signals and present in the motor vehicle can be used as an indicator of, or as an influential quantity on, a measurement of the demand. If the accuracy falls below, for example, a predefined accuracy threshold, a demand can be assumed.

As an alternative or in addition to an active request according to the demand, the taking-into-account of the transmitted own-terminal position may also have a different form depending on the situation when determining the own-vehicle position.

For example, own-terminal position data—if available—can basically always be transmitted to the vehicle but can be taken into account only when the navigation system fixedly installed in the motor vehicle does not succeed in a self-localization, when a mobile terminal is connected to the interface, and/or when the motor vehicle is situated in a populated area (especially in the center of a city).

Furthermore, the request and/or the taking into account of an own-terminal position may depend on what accuracy a position signal has that is present in the case of the motor vehicle and is based on satellite signals (particularly GPS/GNSS). If an own-terminal position has been transmitted to the motor vehicle and a position signal based on satellite signals is present at the motor vehicle, their accuracies can be determined, compared, and the more accurate signal can be used. A higher-expenditure fusion of both signals is basically also contemplated.

According to a preferred embodiment of the invention, the accuracy of a position signal based on satellite signals and present at the vehicle is therefore determined, and the transmitted own-terminal position will then only be determined when determining the own-vehicle position if the accuracy of the position signal based on satellite signals falls below a predefined accuracy threshold.

The self-localization according to the invention, in the extreme case, takes place completely unnoticed by the operator or in a manner not noticeably different from that in the case of conventional fixedly installed vehicle navigation systems—unless the operator notices that the overall navigation system (composed of the navigation system fixedly installed in the motor vehicle and of the mobile terminal) presenting itself to him has a better capability for self-localization when the mobile terminal is present in the motor vehicle.

In order to, among other things, signal to the operator that the equipping of his navigation system according to the invention results in an increased value for him, a visual display can be provided, ideally can be integrated in the graphic output of the navigation system, by which it is indicated to the operator that (or when) the own-terminal position is actually received and/or taken into account by the vehicle navigation system. As an alternative or in addition, a corresponding logging can be carried out, and the operator can, for example, later retrieve in a menu-controlled manner whether, when or how often the own-terminal position has actually been received and/or taken into account by the vehicle navigation system.

When the mobile terminal is not present in the motor vehicle or when, because of a lack of radio network signals, it does not succeed in self-localization, the self-localization of the navigation system fixedly installed in the motor vehicle will preferably take place in a manner known per se exclusively based on satellite signals and, if necessary, odometry.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a flow chart illustrating an exemplary method of determining an own-vehicle position of a motor vehicle according to the invention.

DETAILED DESCRIPTION OF THE DRAWING

A motor vehicle includes a navigation system. The motor vehicle has the suitability for self-localization on the basis of GPS/GNSS, as well as an interface for linking up a mobile terminal. In addition, it is assumed that the mobile terminal itself is suitable for self-localization on the basis of WLAN (if necessary, combined with additional methods for self-localization and/or position tracking).

Referring to FIG. 1, a method of determining the own-vehicle position of the motor vehicle is illustrated. The method begins 10 by determining an own-terminal position of a mobile terminal equipped for self-localization 12. The determined own-terminal position of the mobile terminal is transmitted to and received in the motor vehicle, which is equipped with a fixedly installed navigation system, via an interface 14. The own-vehicle position is then determined taking into account the received own-terminal position 16, before ending 18.

The self-localization on the basis of WLAN represents the presently preferred case of self-localization based on wireless radio networks. However, an aspect of the invention also includes an alternative or additional self-localization on the basis of mobile radio. Also, wireless technologies developed or reaching marketability in the future, such as the RFID, UWB, etc. can be integrated if the mobile terminal is correspondingly constructed. In the case of such a further development of the invention, a vehicle self-localization improved according to the invention could, in particular, also be retrofitted.

By way of the interface, the mobile terminal transmits its position to the motor vehicle and the motor vehicle uses it in critical situations in order to improve the self-localization of the vehicle.

In this case, the main attention is focused on the use of the WLAN self-localization method of the mobile terminal. Today's vehicles or their navigation systems normally have no WLAN antenna and also, not necessarily, a data connection. Mobile terminals, such as the so-called iPHONE® manufactured by APPLE, however, have both a WLAN antenna and a data connection and can be linked up with a motor vehicle by way of interfaces and communication processes known per se.

WLAN self-localization methods or systems normally function relatively well precisely in those situations which are critical for the satellite-based self-localization of a vehicle,—specifically in city centers with high building densities and high buildings. In city center areas, the coverage with WLAN base stations is normally very high and there is good data link-up. The data connection is often required for WLAN localization because a detection of WLAN signals takes place, for example, by the mobile terminal, but these signals are transmitted to a server by which the position can be determined. As an alternative, a data bank for WLAN positioning can also be stored on the mobile terminal.

Although WLAN self-localization often functions only during stoppages or at low speeds (and the accuracy is often poorer than that of a GPS self-localization); in city centers, however, the driving usually takes place at low speeds, particularly when driving in and out of parking garages. In addition, in the case of a high density of WLAN hotspots, as can be found in the centers of cities, the accuracy of a WLAN self-localization will increase.

A WLAN-based self-localization can therefore be very valuable if no GPS signal at all is available. A reference position that is as accurate as possible can then be obtained on WLAN basis, which can then easily be updated for a longer time period by means of odometry.

Summarizing, by way of the invention, a clearly improved self-localization of the vehicle is made possible in critical situations. The invention has special advantages in the case of double-track motor vehicles, particularly automobiles, since these are currently already equipped for the link-up of mobile terminals.

The invention also has special advantages in the case of single-track motor vehicles, particularly motorcycles, because currently their navigation systems often have a still less pronounced capability or accuracy of self-localization than, for example, navigation systems of automobiles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of performing vehicle navigation with a fixedly installed navigation system, the method comprising the acts of:

receiving, by the fixedly installed navigation system via an interface, an own-terminal position of a mobile terminal equipped for self-localization, the own-terminal position having been determined by the mobile terminal using a wireless radio network independent of satellite-based signals;

determining, by the fixedly installed navigation system using satellite-based signals, an own-vehicle position of the motor vehicle separately from the determined own-terminal position; and performing vehicle navigation via the navigation system fixedly installed in the motor vehicle using the own-vehicle position determined using satellite-based signals while simultaneously taking into account the own-terminal position received from and determined by the mobile terminal using the wireless radio network independent of satellite-based signals.

2. The method according to claim 1, wherein the wireless radio network is WLAN.

3. The method according to claim 1, further comprising performing operating input for the vehicle navigation solely via operating devices of the motor vehicle.

4. The method according to claim 3, further comprising the act of:

providing graphic output of the vehicle navigation solely by way of display devices of the motor vehicle.

5. The method according to claim 1, further comprising providing graphic output of the vehicle navigation solely via display devices of the motor vehicle.

6. The method according to claim 1, further comprising the act of:

sending a request from the motor vehicle, via the interface, to the mobile terminal in order to prompt the mobile terminal to transmit the own-terminal position of the mobile terminal for receipt via the interface.

7. The method according to claim 6, further comprising the acts of:

determining a need for receipt of the own-terminal position of the mobile terminal by the motor vehicle;

requesting, by the motor vehicle, the receipt of the own-terminal position of the mobile terminal when it is determined that the need exists.

8. The method according to claim 7, wherein the need exists when a measurement of demand for receiving the own-terminal position exceeds a predefined demand threshold.

9. The method according to claim 1, further comprising the acts of:

determining an accuracy of a position signal present at the motor vehicle, which position signal is based on satellite signals and one or more vehicle sensors;

only receiving the own-terminal position determined by the mobile terminal when the accuracy of the position signal is less than a predefined accuracy threshold.

10. A method of performing vehicle navigation using a navigation system fixedly installed in the motor vehicle, the method comprising the acts of:

receiving, by a mobile terminal via a motor vehicle interface, a request for an own-terminal position determination of the mobile terminal equipped for self-localization;

determining, by the mobile terminal, the own-terminal position of the mobile terminal by the self-localization using a wireless radio network independent of satellite-based signals; and transmitting the own terminal-position determined independent of satellite-based signals from the mobile terminal to the motor vehicle via the interface, whereby the transmitted own-terminal position is utilizable by the navigation system to perform vehicle navigation in combination with an own-vehicle position of the motor vehicle separately determined by the navigation system using satellite-based signals.

11. The method according to claim 10, wherein the wireless radio network is WLAN.

* * * * *